United States Patent
Liu et al.

(10) Patent No.: US 7,552,616 B2
(45) Date of Patent: Jun. 30, 2009

(54) IMPACT PLATFORM FOR DROP TESTING

(75) Inventors: Yu-Lin Liu, Shenzhen (CN); Zhong-Shao Luo, Shenzhen (CN); Xue-Ji Luo, Shenzhen (CN); Qiang Zeng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/829,977

(22) Filed: Jul. 30, 2007

(65) Prior Publication Data
US 2008/0209980 A1  Sep. 4, 2008

(30) Foreign Application Priority Data
Mar. 1, 2007  (CN) ............... 2007 2 0200106 U

(51) Int. Cl.
*G01M 7/00* (2006.01)
*G01N 3/00* (2006.01)
*G01N 33/00* (2006.01)
*G01P 15/00* (2006.01)
*B66F 3/22* (2006.01)

(52) U.S. Cl. .................. 73/12.13; 254/122
(58) Field of Classification Search ........... 73/12.13
See application file for complete search history.

(56) References Cited

U.S. PATENT DOCUMENTS

| | | | | |
|---|---|---|---|---|
| 2,531,880 A | * | 11/1950 | Herring | 248/669 |
| 2,624,535 A | * | 1/1953 | Bollhoefer | 248/669 |
| 3,350,065 A | * | 10/1967 | Mankey | 254/122 |
| 3,410,328 A | * | 11/1968 | Sasai | 220/9.2 |
| 3,556,481 A | * | 1/1971 | Mueller et al. | 254/122 |
| 3,623,707 A | * | 11/1971 | Klopp | 254/22 |
| 3,917,211 A | * | 11/1975 | Daunderer et al. | 248/421 |
| 4,249,749 A | * | 2/1981 | Collier | 280/35 |
| 4,405,116 A | * | 9/1983 | Eisenberg | 254/122 |
| 4,744,712 A | * | 5/1988 | Mitchell | 414/217 |
| 4,926,760 A | * | 5/1990 | Sack | 108/145 |
| 4,934,647 A | * | 6/1990 | Edwards | 248/371 |
| 4,941,797 A | * | 7/1990 | Smillie, III | 414/462 |
| 5,379,855 A | * | 1/1995 | Juang | 187/269 |
| 5,476,050 A | * | 12/1995 | Zimmer et al. | 108/145 |
| 5,569,013 A | * | 10/1996 | Evans et al. | 414/458 |
| 5,694,864 A | * | 12/1997 | Langewellpott | 108/145 |
| 7,185,867 B2 | * | 3/2007 | Hill et al. | 248/421 |
| 7,331,425 B2 | * | 2/2008 | Bukowski et al. | 187/269 |

* cited by examiner

*Primary Examiner*—Lisa M Caputo
*Assistant Examiner*—Octavia Davis
(74) *Attorney, Agent, or Firm*—Frank R. Niranjan

(57) ABSTRACT

An impact platform (30) for use in drop testing includes a bottom plate (33), a lift plate (31), a bracket (35), and an action member (37). The lift plate is parallel to the bottom plate and capable of moving up and down relative to the bottom plate. The bracket is slidably connected between the lift plate and the bottom plate. The bracket comprises two frames (36, 38) connected to each other and being capable of rotating relative to each other about a common axis. Each frame has a first connecting portion (363, 383) attached to the lift plate and a second connecting portion (365, 385) attached to the bottom plate. The action member is rotatably insertable into the first connecting portions or the second connecting portions of the two frames of the bracket for controlling the movement of the lift plate.

7 Claims, 4 Drawing Sheets

IMPACT PLATFORM FOR DROP TESTING

BACKGROUND OF THE INVENTION

1. Field of the Invention

The present invention relates to impact platforms, and more particularly to a height adjustable impact platform for drop testing.

2. Description of Related Art

Drop testing is where some parts or an assembly of a product are made to fall from a certain height, to see how well the product withstands impacts. In a conventional drop test, the product is above an impact area and allowed to drop. The impact area is at a fixed height, so blocks are utilized for changing the height of the impact area. This method adds to the cost of testing.

What is needed, therefore, is an adjustable impact platform for use in a drop test.

SUMMARY

An impact platform for use in drop testing includes a bottom plate, a lift plate, a bracket, and an action member. The lift plate is parallel to the bottom plate and capable of moving up and down parallel to the bottom plate. The bracket is slidably connected between the lift plate and the bottom plate. The bracket comprises two frames connected to each other and being capable of rotating relative to each other. Each frame has a first connecting portion attached to the lift plate and a second connecting portion attached to the bottom plate. The action member is rotatably insertable into the first connecting portions or the second connecting portions of the two frames of the bracket for controlling the movement of the lift plate.

Other advantages and novel features of the present invention will become more apparent from the following detailed description of a preferred embodiment when taken in conjunction with the accompanying drawings, in which:

DETAILED DESCRIPTION OF THE EMBODIMENT

Figure 1:
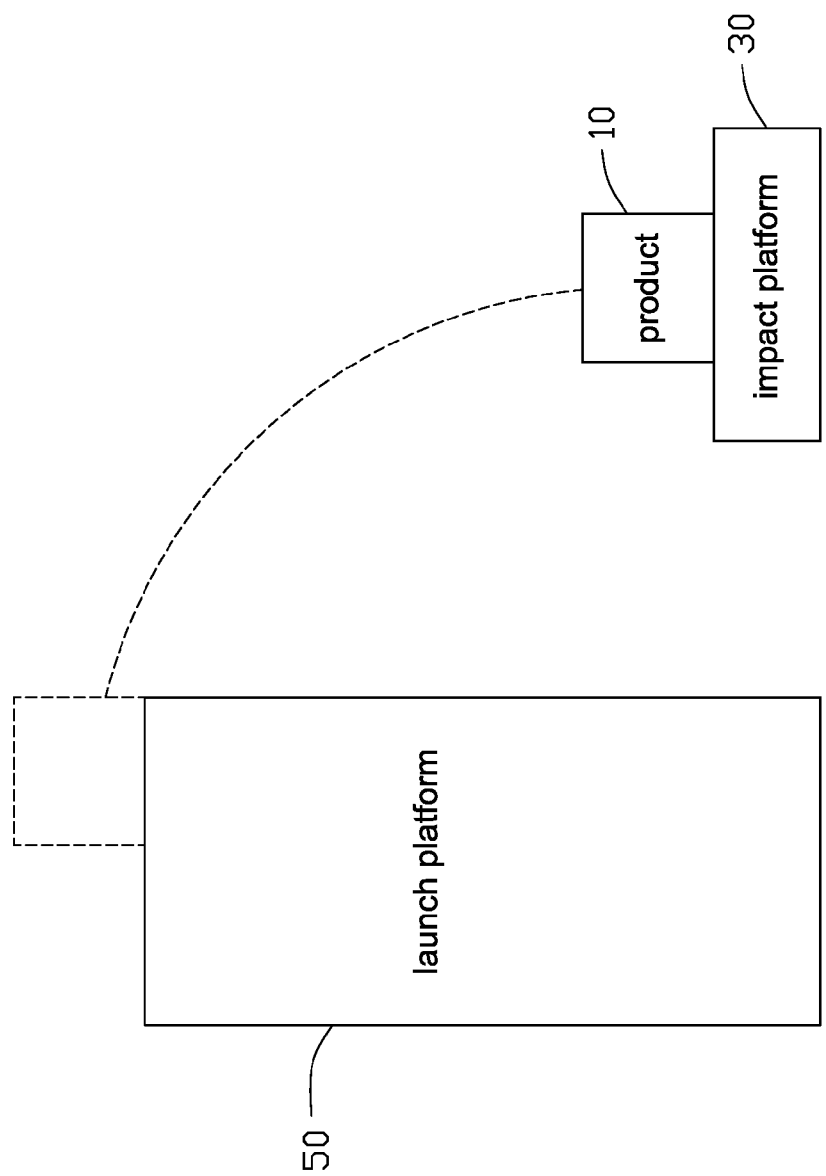
FIG. 1 is a schematic view of a drop test in accordance with a preferred embodiment of the present invention.

Referring to FIG. 1, showing a schematic view of a product 10 to be tested in a drop test. In the drop test, the product 10 is placed on a launch platform 50 then dropped onto an impact platform 30. The product 10 is then tested in order to see how well the product withstands the impact.

Figure 2:
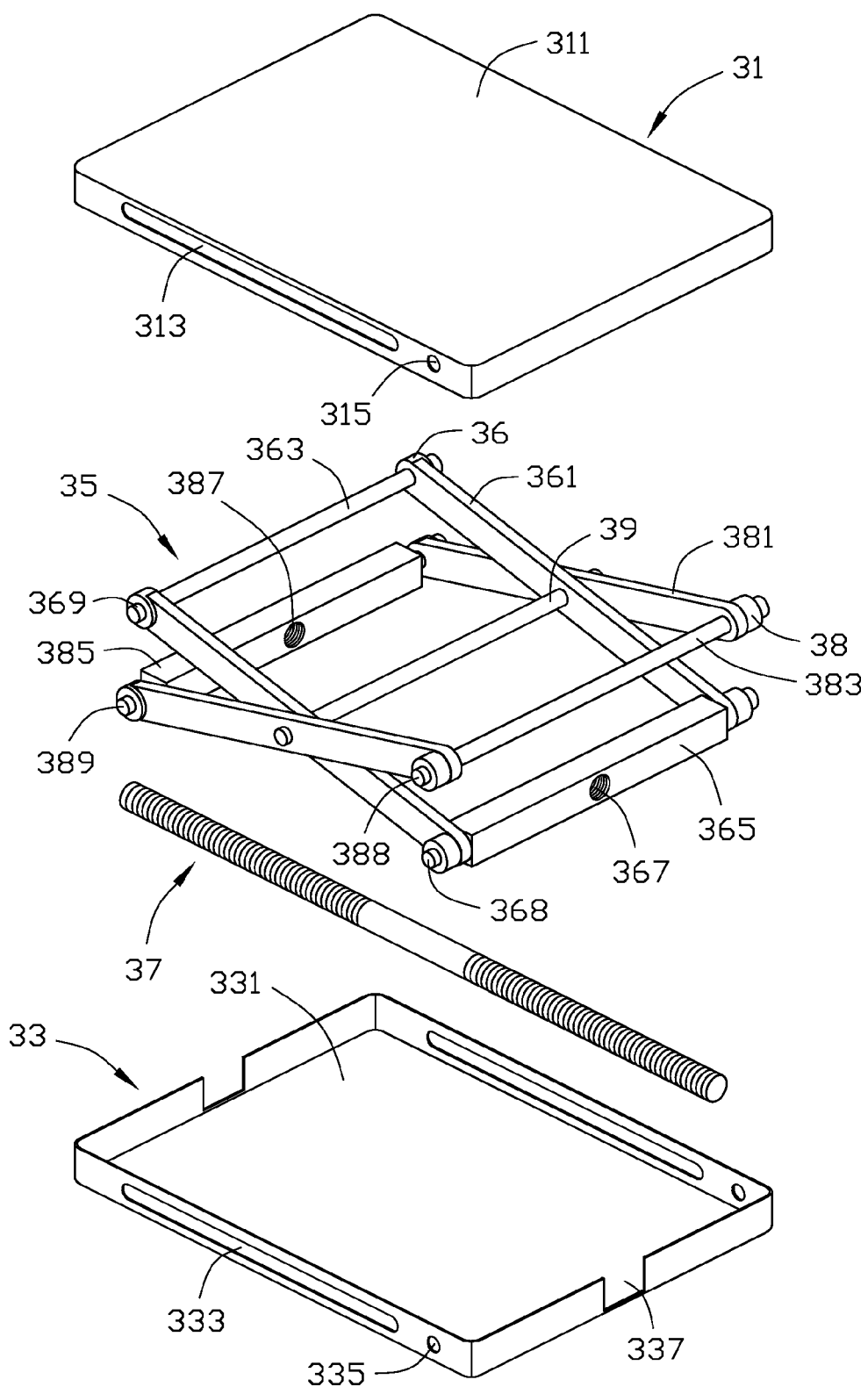
FIG. 2 is an exploded, isometric view of an impact platform in accordance with a preferred embodiment of the present invention.

Referring to FIG. 2, the impact platform 30 of an embodiment of the present invention includes a lift plate 31, a bottom plate 33, a bracket 35 connected between the lift plate 31 and the bottom plate 33, and an action member 37 rotatably fixed on the bracket 35.

The lift plate 31 includes a rectangular top surface 311, and a pair of side surfaces respectively extending down from opposite edges of the top surface 311 generally perpendicular to the top surface 311. Each one of the pair of side surfaces has a long narrow first slot 313 defined symmetrically centered therein. A circular first pivot hole 315 is defined adjacent to each first slot 313.

The bottom plate 33 includes a rectangular bottom surface 331, and from each edge around the bottom surface 331 a side surface extends generally perpendicular to the bottom surface 331. Two second slots 333 equivalent to the first slots 313 of the lift plate 31 are respectively defined in opposite side surfaces, and two second pivot holes 335 equivalent to the first pivot holes 315 of the lift plate 31 are respectively defined adjacent to the corresponding second slots 333. A pair of receiving openings 337 is defined on the other opposite side surfaces respectively.

The bracket 35 includes a first frame 36 and a second frame 38 connected to each other through a rotary member 39. The first and second frames 36, 38 are respectively connected to the lift plate 31 and the bottom plate 33, and the first frame 36 is located within the second frame 38. The first frame 36 includes a first connecting portion 363 connected to the lift plate 31 and a second connecting portion 365 connected to the bottom plate 33. The second frame 38 also includes a first connecting portion 383 connected to the lift plate 31 and a second connecting portion 385 connected to the bottom plate 33. One end of the first connecting portion 363 is connected to one end of the second connecting portion 365 by a first shaft 361, and the other end of the first connecting portion 363 is connected to the other end of the second connecting portion 365 by another first shaft 361, the two first shafts 361 are in parallel. Two second shafts 381 are connected to the ends of the first connecting portion 383 and the second connecting portion 385 of the second frame 38 in the same manner as the first shafts 361 are connected. The rotary member 39 rotatably connects centers of the first and second shafts 361, 381, tying the first and second shafts 361, 381 together but allowing rotation about a common axis, namely the central axis of the member 39. The distance between the first connecting portions 363, 383 is equal to that between the second connecting portions 365, 385. The first connecting portions 363, 383 of the first and second frames 36, 38 are cylindrical poles, and the second connecting portions 365, 385 of the first and second frames 36, 38 are squared beams. A pair of threaded holes 367, 387 is defined in the centers of the second connecting portions 365, 385 respectively, for mounting the action member 37. The first connecting portion 363 of the first frame 36 forms two posts 369 at opposite ends respectively, for sliding into the corresponding first slots 313 of the lift plate 31, and the second connecting portion 365 of the first frame 36 forms two pivots 368 at opposite ends respectively, for pivoting in the corresponding second pivot holes 335 of the bottom plate 33. The first connecting portion 383 of the second frame 38 forms two pivots 388 at opposite ends respectively, for pivoting in the corresponding first pivot holes 315 of the lift plate 31, and the second connecting portion 385 of the second frame 38 forms two posts 389 at opposite ends respectively, for sliding into the corresponding second slots 333 of the bottom plate 33.

The action member 37 defines two threaded ends, for engaging in the corresponding threaded holes 367, 387 of the bracket 35. The action member 37 can be fixed at different positions to have the first and second frames 36, 38 to rotate around the rotary member 39, thus adjusting the height of the bracket 35. The distance between the first connecting portions 363, 383 and between the second connecting portions 365, 385 will change accordingly with changes in the distance between the lift plate 31 and the bottom plate 33. The action member 37 can also be fixed on the first connecting portions 363, 383 of the bracket 35, and then the center of each first connecting portion 363, 383 defining a threaded hole respectively for mounting the action member 37.

Figure 3:
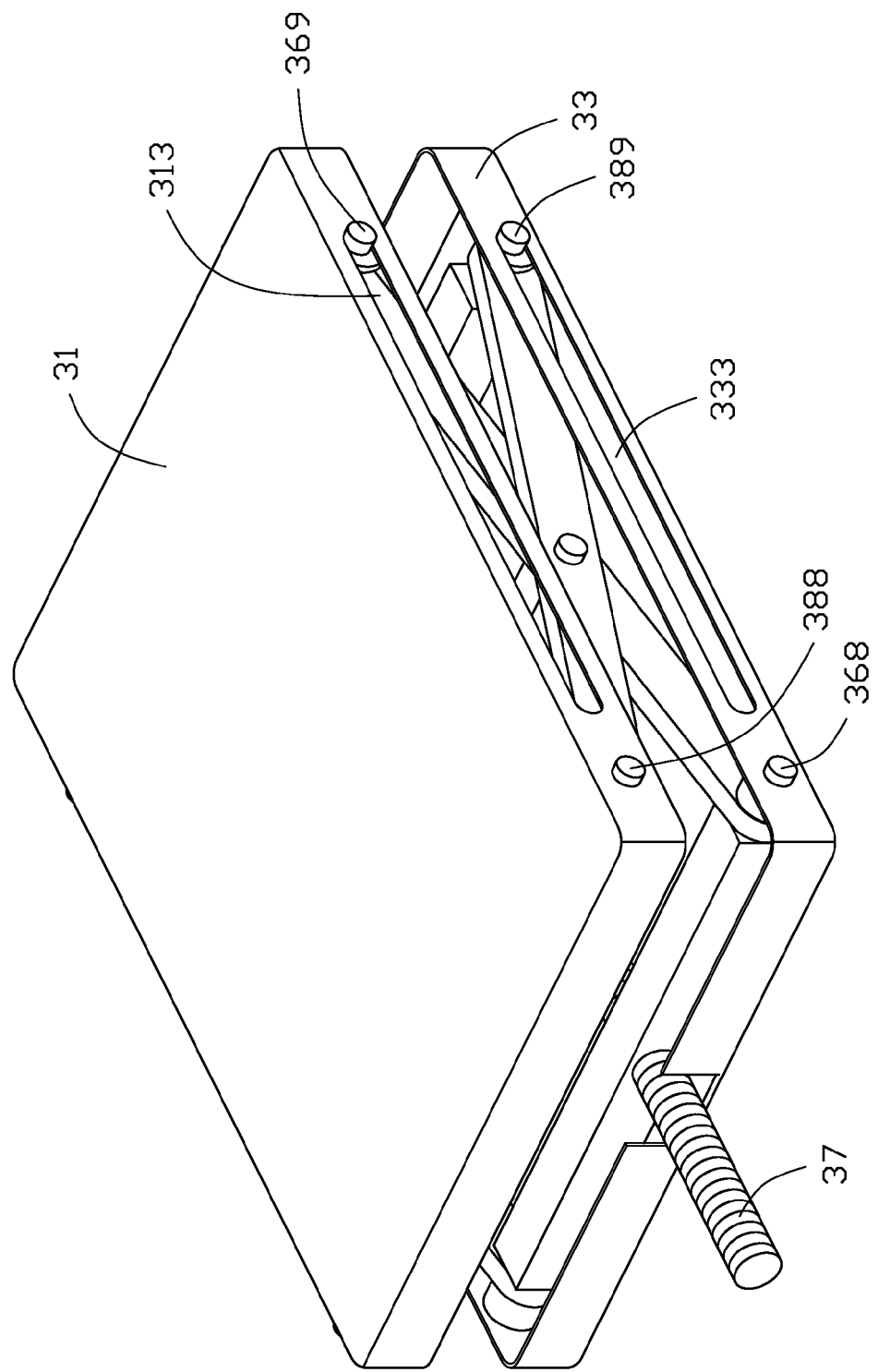
FIG. 3 is an assembled view of the impact platform of FIG. 2.
Figure 4:
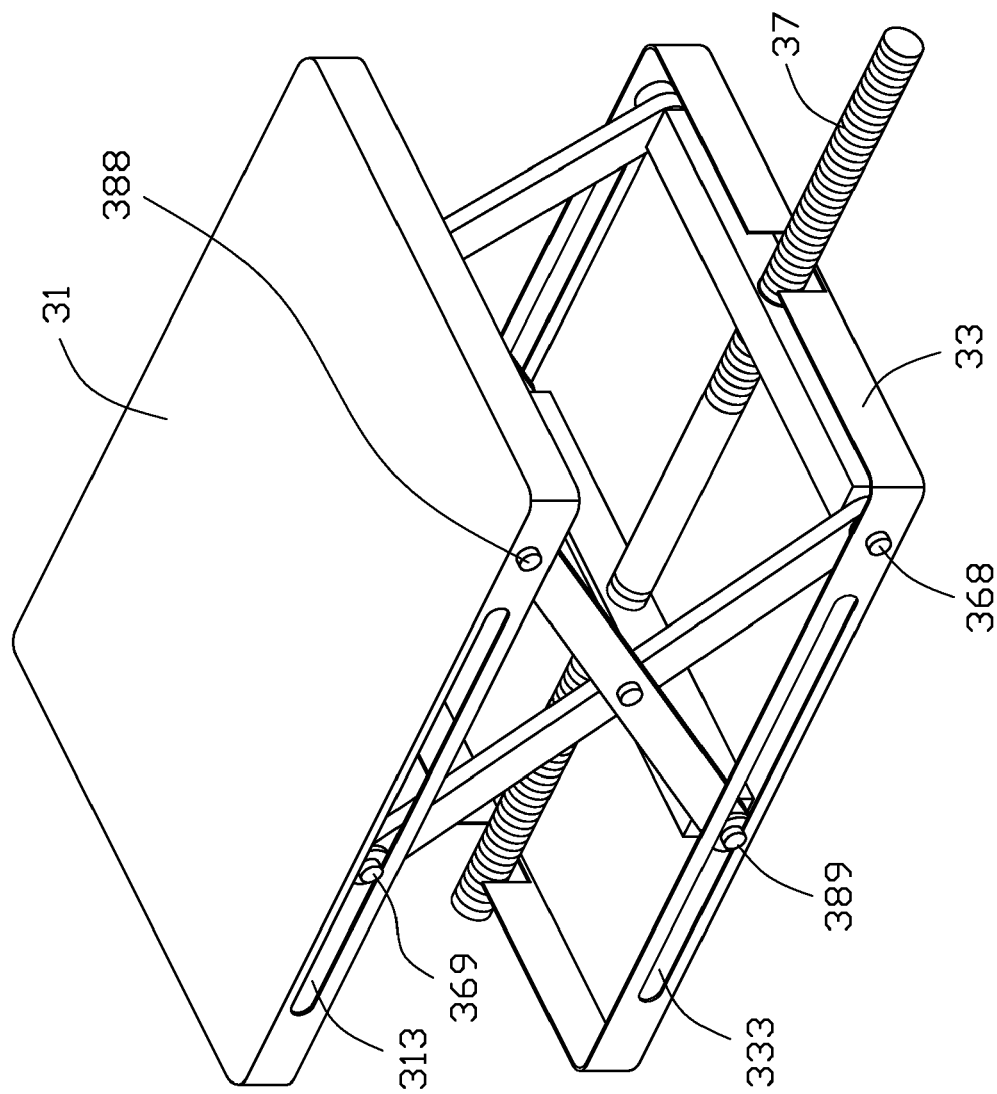
FIG. 4 is an assembled view of the impact platform of FIG. 2, but viewed from another aspect and operating in another state.

Referring also to FIGS. 3 and 4, in assembly, the bracket 35 is installed between the lift plate 31 and the bottom plate 33. The pivots 388, 368 and the posts 369, 389 of the bracket 35 are respectively inserted into the first, second pivot holes 315, 335 and the first, second slots 313, 333 of the lift plate 31 and the bottom plate 33. The action member 37 is then screwed into the threaded holes 367, 387 of the bracket 35. The ends of the action member 37 are respectively located in the corresponding receiving opening 337 of the bottom plate 33. In other embodiments, the action member 37 can be installed on the bracket 35 first, and then an assembly of the action member 37 and the bracket 35 is installed between the lift plate 31 and the bottom plate 33. When the action member 37 is rotated, the posts 369, 389 of the bracket 35 slide in the corresponding slots 313, 333 and the pivots 388, 368 of the bracket 35 pivot in the corresponding pivot holes 315, 335 to adjust the height and width of the bracket 35. The distance between the first connecting portions 363, 383, and between the second connecting portions 365, 385 of the bracket 35 will increase or reduce simultaneously. The distance between the first connecting portion 363 and the second connecting portion 385, and the distance between the first connecting portion 383 and the second connecting portion 365 will increase or reduce simultaneously to realize the adjustable height of the impact platform 30. Therefore, the impact platform 30 is easily made ready to receive the corresponding product 10 dropped from the launch platform 50 in the drop test.

In drop testing, products having different weights need to fall from different heights above the impact platform 30 for testing according to the requirements of clients. At this time, the impact platform 30 can be adjusted through the rotation of the action member 37, and it is needless to place blocks under the impact platform 30 to adjust the height.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A platform for use in drop testing, comprising:
    a bottom plate comprising a pair of slots defined in two opposite sides thereof and a pair of a pivot holes defined adjacent to the respective slots;
    a lift plate substantially parallel to the bottom plate, the lift plate being movable relative to the bottom plate;
    a collapsible support connected between the lift plate and the bottom plate, the collapsible support comprising two frames pivotally connected to each other at centers thereof and being rotatable relative to each other, each frame having a first connecting portion attached to the lift plate and a second connecting portion attached to the bottom plate, one of the second connecting portions comprising a pair of posts formed on opposite ends thereof slidably received in the corresponding slots of the bottom plate, and the other of the second connecting portions comprising a pair of pivots formed on opposite ends thereof engaged in the corresponding pivot holes of the bottom plate, the first connecting portions of the two frames are cylindrical poles, and the second connecting portions of the two frames are squared beams; and
    an action member rotatably extending through and being threadedly engaged with the first connecting portions or the second connecting portions of the two frames of the collapsible support for raising or lowering the lift plate;
    wherein a pair of receiving openings is defined in two other opposite sides of the bottom plate for extension of the action member therethrough, the action member is rotatable, and the first connecting portions and the second connecting portions are capable of moving along a direction parallel to the action member.

2. The platform as described in claim 1, wherein the lift plate has a pair of slots defined in two sides thereof and a pair of pivot holes defined adjacent to the respective slots, one of the first connecting portions includes a pair of posts formed on opposite ends thereof slidably received in the corresponding slots, and the other of the first connecting portions includes a pair of pivots formed on apposite ends thereof engaged in the corresponding pivot holes.

3. The platform as described in claim 2, wherein the lift plate comprises a top surface and a pair of side surfaces extending downward from opposite edges of the top surface substantially perpendicular to the top surface, and the slots are respectively defined in the side surfaces.

4. The platform as described in claim 1, wherein the bottom plate comprises a bottom surface and a pair of side surfaces extending upward from apposite edges of the bottom surface substantially perpendicular to the bottom surface, the slots being defined in the side surfaces.

5. The platform as described in claim 1, wherein each frame comprises a pair of parallel shafts connected between the first connecting portion and the second connecting portion.

6. The platform as described in claim 5, wherein a rotary member is pivotably inserted into the center of each shaft for connecting the two frames.

7. The platform as described in claim 1, wherein a pair of threaded holes is defined in the first connecting portions or the second connecting portions of the collapsible support, the action member defines threaded portions at each end, for screwing into the corresponding threaded holes.

* * * * *